April 28, 1953    S. SHALER    2,636,402
METHOD OF MAKING PINKING SHEARS CUTTERS
Filed June 30, 1950    2 SHEETS—SHEET 2
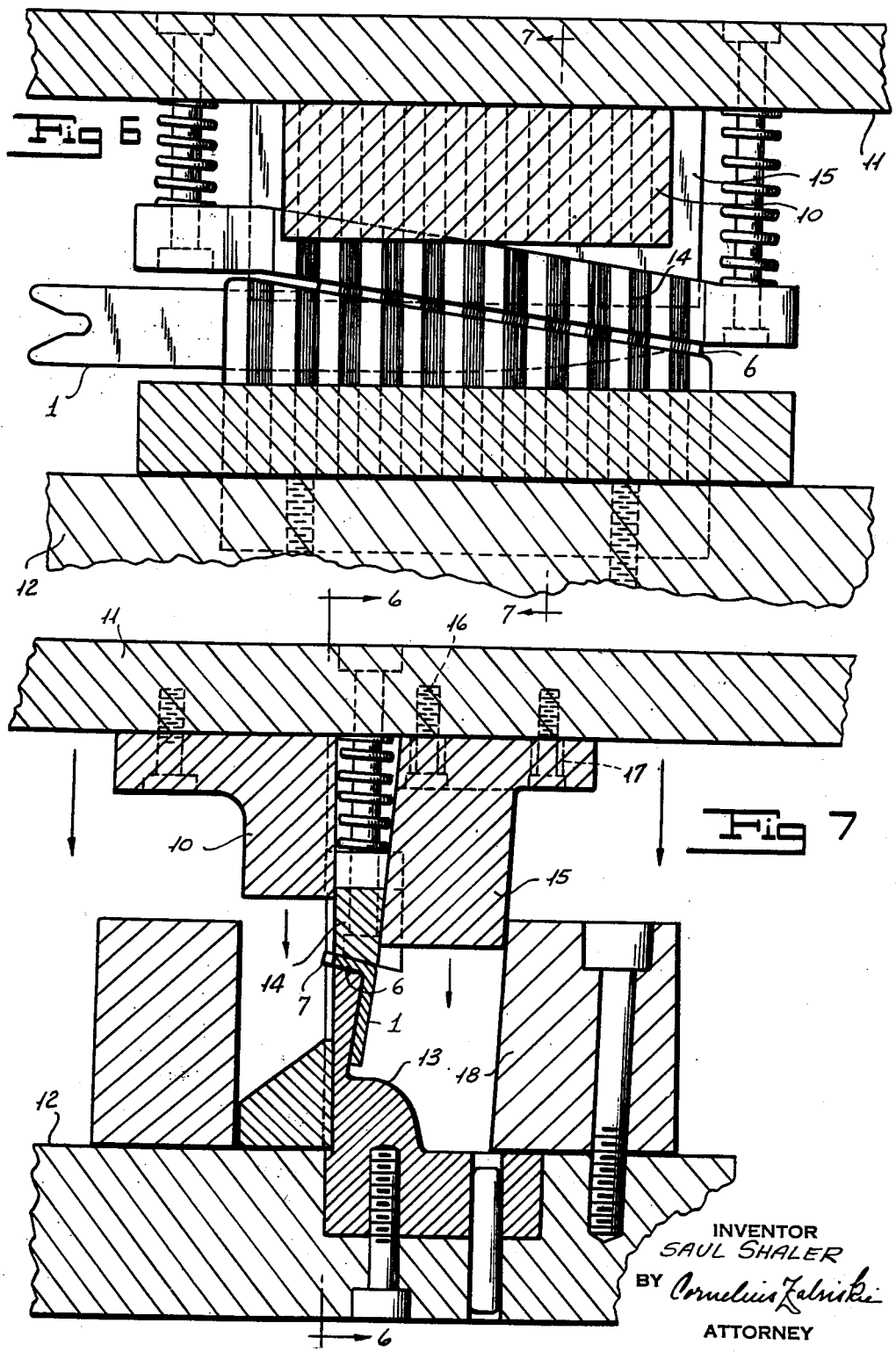
INVENTOR
SAUL SHALER
BY Cornelius Zabriskie
ATTORNEY Patented Apr. 28, 1953

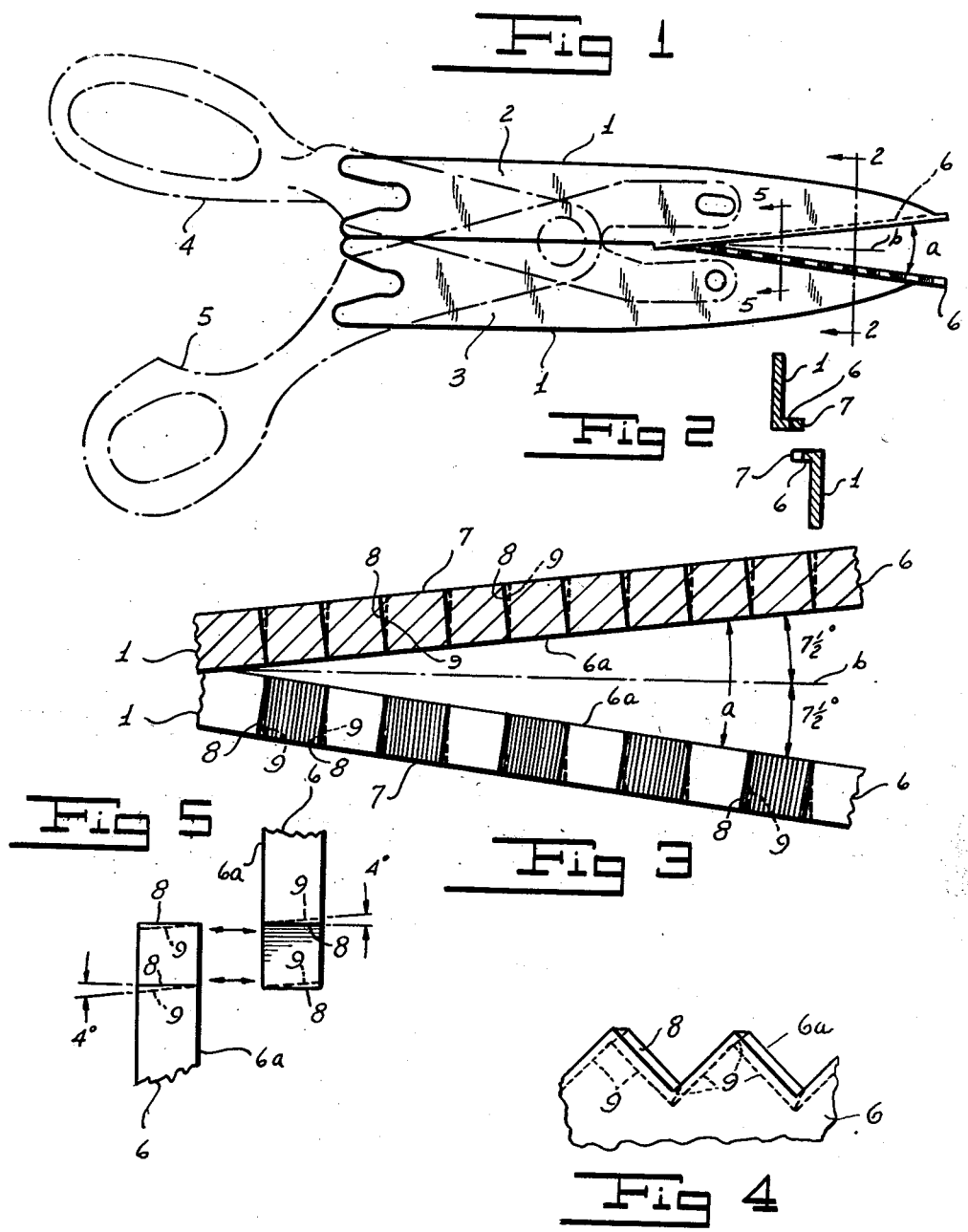

2,636,402

UNITED STATES PATENT OFFICE 2,636,402

METHOD OF MAKING PINKING SHEARS CUTTERS

Saul Shaler, Jackson Heights, N. Y.

Application June 30, 1950, Serial No. 171,467

5 Claims. (Cl. 76—104)

This invention relates to the manufacture of pinking shears and more particularly to the provision of efficient cutting edges on such shears.

In pinking shears the cutting is accomplished by two blades, the cutting edges of which are complementarily serrated so that, as the blades are brought together with a shearing action, the successive teeth of the two blades pass through one another in a complementary manner and "in mesh." In order to cut properly, the "teeth" of each blade must accurately interfit with the corresponding spaces between teeth of the other blade, with the coacting edges of the respective teeth keen and close fitting. If the teeth do not properly interfit with one another or the edges are not keen, the fabric to be cut will be drawn or torn rather than cleanly cut.

The problem of producing properly interfitting keen edged teeth has long been a serious manufacturing problem in the making of pinking shears. The most common methods of obtaining accuracy, within fair operating limits has been to mill or broach the teeth and thereafter lap them, care being taken to fit individual pairs of blades for proper cooperation with one another. This prior practice is expensive and requires a high degree of skill and accurate machinery, grinding wheels, etc., and the operations must be painstakingly performed.

The primary object of the present invention is to provide a simple and economical method of producing sharp and accurate teeth by quantity production and without requiring the fitting of matched pairs of blades. The present invention makes it possible to manufacture these blades in bulk and thereafter assemble any two blades thus made and yet obtain keen interfitting cooperation in the end product shears.

In practically carrying out the invention in its preferred practical form, I preferably blank out each of the blades from flat sheet metal stock. During the blanking operation, the serrated edges which are to form the teeth are cut with the serrated edges of the teeth normal to the plane of the blank. The edge of the blade along which the serrations are formed is thereafter upset, so that the serrations are positioned along the free edge of a marginal cutting flange. This marginal cutting flange is arranged in angular relation to the longitudinal medial line of the blade so that, when two blades are brought into cooperation in a shears, the flanges will be arranged in diverging relation, whereby the teeth longitudinally of the two blades successively coact as the shears are operated.

It is preferred that the blades move toward on another to effect the cutting in a direction substantially normal to the longitudinal medial lines of the two blades, i. e., that the blades partake of substantially parallel movement toward and away from one another. Inasmuch as the teeth are blanked with the sides of the teeth normal to the faces of the flanges, it is apparent that the teeth of two blades so mounted and operated cannot properly mesh. I therefore recut at least one side of each tooth of each blade, so as to permit the teeth of the two blades to successively pass through one another. This cutting is in the nature of a "shaving" operation, wherein at least one edge of each tooth is shaved away back of the leading edges of the teeth. The shaving operation is preferably so performed as to not materially change the shape of the cutting edges of the teeth, but to give clearance back of such cutting edges, as hereafter more fully described. If the flanges of the cutting edges are thereafter ground flat and the cutters hardened, the teeth will be provided with sharp cutting edges with adequate clearance.

Features of the invention, other than those adverted to, will be apparent from the hereinafter detailed description and claims, when read in conjunction with the accompanying drawings.

The accompanying drawings show consecutive steps in carrying out the invention in its preferred form, but the particular structures therein illustrated are to be understood as illustrative only and not as defining the limits of the invention.

Figure 1 is a face view of a pinking shears, the blades of which may be accurately made according to the present invention.

Figure 2 is a section on the line 2—2 of Figure 1.

Figure 3 graphically illustrates the relative divergent relation between the cutting teeth of the two blades of Figure 1 and the manner in which the teeth are cut according to the present invention.

Figure 4 is a fragmental side elevation of one of the serrated edges shown in Figure 3, showing in like manner the different cuts by which such edges are formed.

Figure 5 is a fragmental section on the line 5—5 showing the relation of the teeth as illustrated in Figure 2, both before and after the shaving cuts to which I have referred.

Figure 6 is a section of a shaving die couple useful in carrying out the present invention, this section being taken on the line 6—6 of Figure 7.

Figure 7 is a transverse section on the line 7—7 of Figure 6.

While the present invention may be employed in connection with pinking shears of different design, I have chosen, for the purpose of illustration, to show the same as employed in the making of pinking shears such as disclosed in my application for United States Letters Patent, Serial No. 149,921, filed March 16, 1950, "Self Adjusting Pinking Shears." Such a pinking shears is shown in Figure 1 of the drawings. It comprises a pair of blades 1 mounted for operation upon levers 2 and 3 provided with handles 4 and 5 and adapted to impart to the blades a substantially parallel movement toward and away from one another.

The blades 1 are made from sheet metal with right angular flanges 6, along the free edges of which are formed serrations constituting teeth 7. The blades are so made and mounted that the flanges 6 are arranged in diverging relation to one another, as shown in Figure 1, and while the angle of divergence a may vary within considerable limits, we will assume for the present description that this angle is 15 degrees. The purpose of the diverging rows of teeth is to insure that at least one tooth of the blade is in mesh with corresponding teeth of the other blade at all times. As the handles 4 and 5 are operated, the flanges 6 move toward and away from one another to successively mesh the teeth. This movement is in the direction substantially normal to a line b bisecting the angle of divergence. This is peculiar to the shears shown in Figure 1, although the movement of the blades toward one another may differ from the rectilinear movement referred to and still the invention is useful in conjunction therewith.

In accordance with the method of this invention, each of the blades 1 and 2 is initially blanked from flat sheet metal stock and during this blanking operation the edges of the blades are serrated to form the teeth 7. These teeth are cut fairly accurate and uniform and of substantially the depth and pitch that they will have in the end product shears. The stamping is accomplished in a direction normal to the face of the blank and consequently the diverging edges of the teeth will be cut substantially normal to the face of the blank. After the blank has been produced, as stated, the toothed or serrated margin thereof is upset to form the flange 6 which extends at right angles to the remainder of the blade. If two blades thus formed are incorporated in the shears shown in Figure 1, the relation of the teeth of such blades will appear from Figures 3, 4 and 5.

By reference to Figure 3 in particular, the relatively heavy full lines indicate the crowns and valleys of the original blanking cuts of the teeth and are designated by the reference character 8 in this figure and in the Figures 4 and 5. Strictly speaking these heavy lines 8 would not show in the upper blade as it appears in Figure 3, but I have illustrated them in this way in the interest of clearness.

From this Figure 3, it is perfectly clear that the two flanges 6 shown in this figure could not possibly be moved toward one another in a direction normal to the plane of the bisecting line b to cause the teeth of one flange to pass through or mesh with the teeth of the other. The inclination of the lines 8 demonstrate that such an operation would be impossible for in this figure the angle of divergence of the flanges is approximately 15°, with an angle of 7½° at each side of the bisecting line b.

In order to permit these teeth to mesh and pass when thus moved, I subject the flange of each blade to a "shaving" operation. This shaving operation may, if desired, be in a direction normal to the plane of the bisecting line b and, if thus performed, it would substantially parallel the faces of the corresponding teeth of both flanges so that they would pass through and mesh with one another. However, I preferably shave these teeth, as indicated by dotted lines 9 in Figures 3, 4 and 5, taking the shaving cut from the contiguous faces of the flanges in a direction away from the cutting edges, indicated at 6a, and I make the shaving cut at such angle that it will slightly undercut the teeth in order to give clearance and provide keen cutting edges 6a.

This may be accomplished, in the illustrative form of the invention shown, by supporting the blade so that its length will be inclined at, for example, 8° to the horizontal. At the same time the blade is supported so that the flange 6 thereof is tilted up slightly, as shown in Figure 7, so that its flange tilts upwardly from the horizontal plane toward its serrated edge at an angle of e. g. 4° to the horizontal. While the flange is held in this compound angle of inclination and tilt, I act upon the blade by a shaving cutter or a die which will preferably leave the cutting edges 6a of the teeth 7 untouched, but will shave the sides of the teeth with a tapering cut in a downward direction to undercut the diverging edges of the teeth both in a direction longitudinally of the flange and in a direction transversely thereof.

Figures 3, 4 and 5 show very clearly the result of this operation, the shaving cuts being made along the heavy dotted lines 9 in these figures. The stock thus removed will be of increasing thickness in a direction away from the cutting edge 6a, producing the undercut illustrated in dotted lines in these figures. By thus undercutting the teeth in a direction away from the cutting edges, these cutting edges of the teeth are not only trued, but clearance is provided back of said cutting edges. When these teeth pass through one another in the assembled manner of Figure 1, the cutting edges will theoretically contact with one another throughout their entire extent but, back of these cutting edges, the teeth will not engage. This will produce clearance assuring the most efficient cutting of fabrics and other materials without drag or tearing action on the goods.

In practically carrying out this invention, I may cut away the entire amount of material which it is desired to remove by a shaving operation in one step, although it may be accomplished by stages embodying a succession of thinner shaving cuts. I may also, if desired, shave both converging edges of the teeth in the manner described by making successive cuts with the flange longitudinally inclined in opposite directions to the horizontal but I find that this is unnecessary in the making of a thoroughly practical and satisfactory blade.

After the teeth are undercut by the method described, the forward face of each flange, i. e., the face at which the cutting edge 6 is formed, is preferably ground by holding it against a grinding wheel or traveling abrasive belt. This grinding operation smooths this forward face of the flange sufficiently to eliminate the slightly rounded edge at the cutting edges of the teeth produced by the original blanking operation and produces sharp cutting edges 6a at the forward edge of each tooth. The blade is then heat treated to harden the teeth so that they will not unduly wear in use.

Cutting edges thus produced are found in practice to be extremely keen and well adapted to carry out their cutting functions upon the finest fabrics including fine silk, rayons and nylons.

The teeth are, moreover, sufficiently rugged to properly back up the cutting edges 6a, so as to permit the use of the shears in the cutting of relatively heavy fabrics, such as overcoat fabrics and the like.

In the carrying out of this invention, I may use apparatus of widely different character. However, for the purpose of illustration, I have shown shaving dies and their cooperating parts in Figures 6 and 7. In these figures 10 designates a shaving die, mounted on a vertical reciprocating head 11 toward and away from stationary bed carrying a stationary supporting die 13. The blade 1 is shown in these figures as held, by a spring pressed holder 14, in engagement with the stationary supporting die 13. Figure 6 shows that the blade is so held inclined at an angle of approximately 8° to the horizontal in the direction of its length and the teeth 7 of the flange are shown as they are originally blanked. They have not yet been shaved. In Figure 7, the tilted position of the flange is apparent, this tilt being shown at approximately 4°.

In the apparatus of these figures, the descent of the shaving die 10 will cause the teeth 7 to be shaved and undercut, as hereinbefore described, the part 15 of these figures constituting a back-up block which moves downwardly with the shaving die to properly back up and support the blade while the shaving cut is made. This back up part 15 is shown as mounted on the head 11 by screws 16 passing through slots 17 to permit shifting of the back up part 15, so that it may be kept in contact with the blade by an abutment 18 on a stationary guide as the shaving die descends.

The foregoing detailed description sets forth the blanking of sheet metal with the blanking die moving normal to the face of the sheet so as to cut the teeth in a direction normal to such face. If desired, however, I may move the blanking die at an angle to the face of the sheet so as to cut these teeth on a slight angle instead of normal to the face of the sheet as stated. In that case, I thereafter shave the teeth, as hereinbefore described, to give clearance and sharp cutting edges.

Also I may blank out the blade without necessarily cutting the teeth during the blanking operation and cut the teeth by a separate operation after the blank has been formed. In this latter case, the teeth may be formed either before or after upsetting cutting flange of the blade. These modification steps are included in this invention.

In accordance with the present invention, it is possible to finish all work on the blade before the hardening step so that the hardening step is the last step in the manufacture of the blade. This makes it possible to more readily manipulate the material of the blade and effect the blanking and shaving operations of its manufacture and nothing needs to be done thereon after a final hardening step. So far as I am aware, this is a novel feature in the making of cutting blades for pinking shears.

From the foregoing disclosure the marked simplicity of the method of the present invention will be apparent. The necessity of milling and lapping of matched blades is entirely unnecessary when the present invention is practised. Blades may be expeditiously produced by this method and used interchangeably as rights and lefts in quantity production of shears of the character illustrated in Figure 1. Every operation involved in the method of this invention is a simple operation to be carried out by unskilled help. So long as the dies are properly made, the end product will be uniform and satisfactory performance of the end product shears is assured.

The method of this invention because of its simplicity makes quantity production possible and not only very materially reduces the cost of production of pinking shears, but insures a very more efficient cutting operation.

The foregoing detailed description sets forth the invention in its preferred practical form, but the invention is to be understood as fully commensurate with the appended claims.

Having thus fully described the invention, what I claim as new and desire to secure by Letters Patent is:

1. The method of making a pinking shears cutter blade which comprises: blanking a blade from sheet metal stock with cutting teeth along one of its free edges, and thereafter rectilinearly shaving the cutting faces of the teeth at a compound angle to provide clearances when two such blades are operated in a pinking shears.

2. Method as claimed in claim 1, wherein the cutting face of the blade is subsequently ground to render keen the cutting edges of the teeth.

3. The method of making a pinking shears cutter blade which comprises: blanking a blade from flat sheet metal stock with serrated teeth along one of its edges, thereafter upsetting the toothed margin of the blade to form a cutting flange carrying the teeth, and thereafter simultaneously rectilinearly shaving both sides of said teeth at angles to both the length and width of the flange.

4. Method as claimed in claim 3, wherein the cutting face of the flange is subsequently ground to render keen the cutting edges of the teeth.

5. The method of making a pinking shears cutter blade which comprises: forcing a die through metal stock in a direction substantially normal to the face of the stock to form a blade blank with a succession of cutting teeth along one margin thereof, and thereafter simultaneously rectilinearly shaving both sides of said teeth at angles to both the length and width of the blade.

SAUL SHALER.

References Cited in the file of this patent

UNITED STATES PATENTS

| Number | Name | Date |
|---|---|---|
| 57,205 | Sowden | Aug. 14, 1866 |
| 489,406 | Austin | Jan. 3, 1893 |
| 567,295 | Coursen | Sept. 8, 1896 |
| 1,959,190 | Wyner et al. | May 15, 1934 |
| 2,204,071 | Dalley | June 11, 1940 |
| 2,284,664 | Kissling | June 2, 1942 |
| 2,286,874 | Schwartz | June 16, 1942 |
| 2,290,203 | Nikonow et al. | July 21, 1942 |
| 2,501,713 | Gillette | Mar. 28, 1950 |
| 2,508,706 | Cohn | May 23, 1950 |
| 2,511,187 | Weidauer | June 13, 1950 |
| 2,565,552 | Ern | Aug. 28, 1951 |
| 2,579,521 | Sorensen | Dec. 25, 1951 |

FOREIGN PATENTS

| Number | Country | Date |
|---|---|---|
| 424,807 | Great Britain | Feb. 28, 1935 |